US008018583B2

(12) United States Patent
Wang

(10) Patent No.: US 8,018,583 B2
(45) Date of Patent: Sep. 13, 2011

(54) LENS SCREENING DEVICE

(75) Inventor: Chung-Pei Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 221 days.

(21) Appl. No.: 12/485,919

(22) Filed: Jun. 17, 2009

(65) Prior Publication Data

US 2010/0073668 A1 Mar. 25, 2010

(30) Foreign Application Priority Data

Sep. 23, 2008 (CN) .......................... 2008 1 0304609

(51) Int. Cl.
*G01B 9/00* (2006.01)

(52) U.S. Cl. ........................................ 356/124; 356/244

(58) Field of Classification Search .................. 356/124, 356/124.5, 125–127, 244, 246; 359/601, 359/608, 609, 813, 822; 345/5, 6, 32
See application file for complete search history.

(56) References Cited

U.S. PATENT DOCUMENTS

| | | | | |
|---|---|---|---|---|
| 3,653,419 | A * | 4/1972 | Schutter | 210/447 |
| 4,113,088 | A * | 9/1978 | Binkhorst | 206/210 |
| 4,354,111 | A * | 10/1982 | Williams et al. | 250/396 R |
| 4,419,182 | A * | 12/1983 | Westerberg | 216/26 |
| 4,722,598 | A * | 2/1988 | Ford | 359/398 |
| 5,233,382 | A * | 8/1993 | Taniguchi et al. | 396/113 |
| 5,302,989 | A * | 4/1994 | Taguchi et al. | 355/22 |
| 5,526,180 | A * | 6/1996 | Rausnitz | 359/609 |
| 5,837,314 | A * | 11/1998 | Beaton et al. | 427/133 |
| 6,417,894 | B1 * | 7/2002 | Goff et al. | 348/832 |
| 6,581,761 | B1 * | 6/2003 | Stafford et al. | 206/5.1 |
| 6,967,635 | B2 * | 11/2005 | Hung | 345/32 |
| 2002/0021437 | A1 * | 2/2002 | Volkenandt et al. | 356/124.5 |

* cited by examiner

*Primary Examiner* — Sang Nguyen
(74) *Attorney, Agent, or Firm* — Altis Law Group, Inc.

(57) ABSTRACT

An lens screening device for controlling diameters of lenses within a range from a lower threshold to a upper threshold. The lens screening device includes a number of connecting poles and two screening plates. Each of the screening plates includes a tray and a scraper slidably disposed on the tray and configure for scraping the tray. The tray defines a number of through holes of same diameter therein. The diameter of the through holes in an upper screening plate is larger than that of the through holes in a lower screening plate.

7 Claims, 2 Drawing Sheets

LENS SCREENING DEVICE

BACKGROUND

1. Technical Field

The present disclosure relates to lens screening devices, particularly, to a lens screening device for screening lenses with a diameter in a predetermined range.

2. Description of Related Art

For the purpose of quality control, after manufactured, lenses need to be visually inspected with assist of a vernier caliper to determine whether the lenses meet size requirements. Such an inspection may not be carried out according to consistent criteria, especially given the human element involved (e.g., variances in skill level of individual inspectors), and is an inefficient use of man-power and resources. In addition, the lenses may be stained during the inspection.

What is needed, therefore, is a lens screening device to overcome the above-mentioned problems.

DETAILED DESCRIPTION

Figure 1:
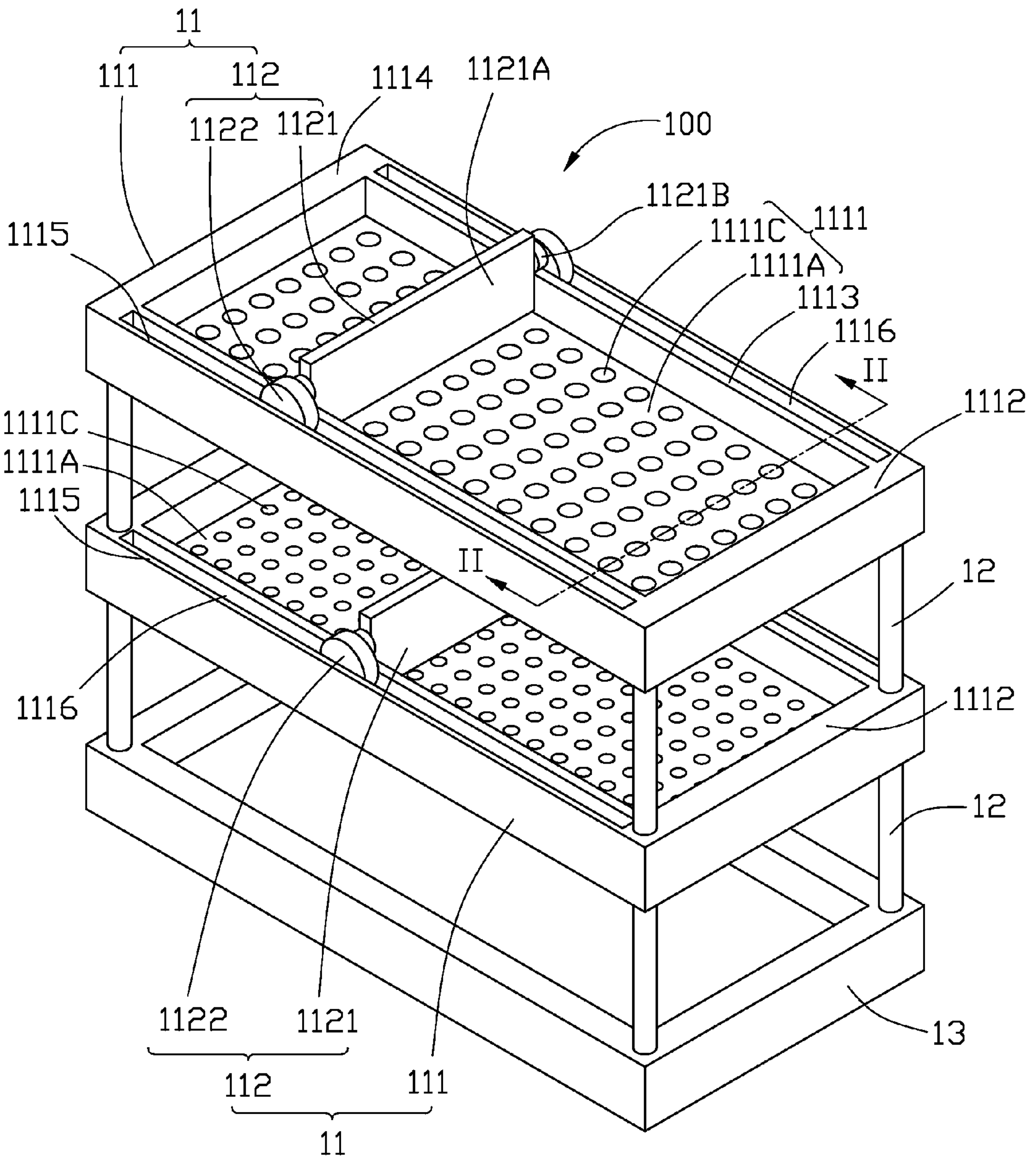
FIG. 1 is an isometric view of a quality control device, according to an exemplary embodiment.
Figure 2:
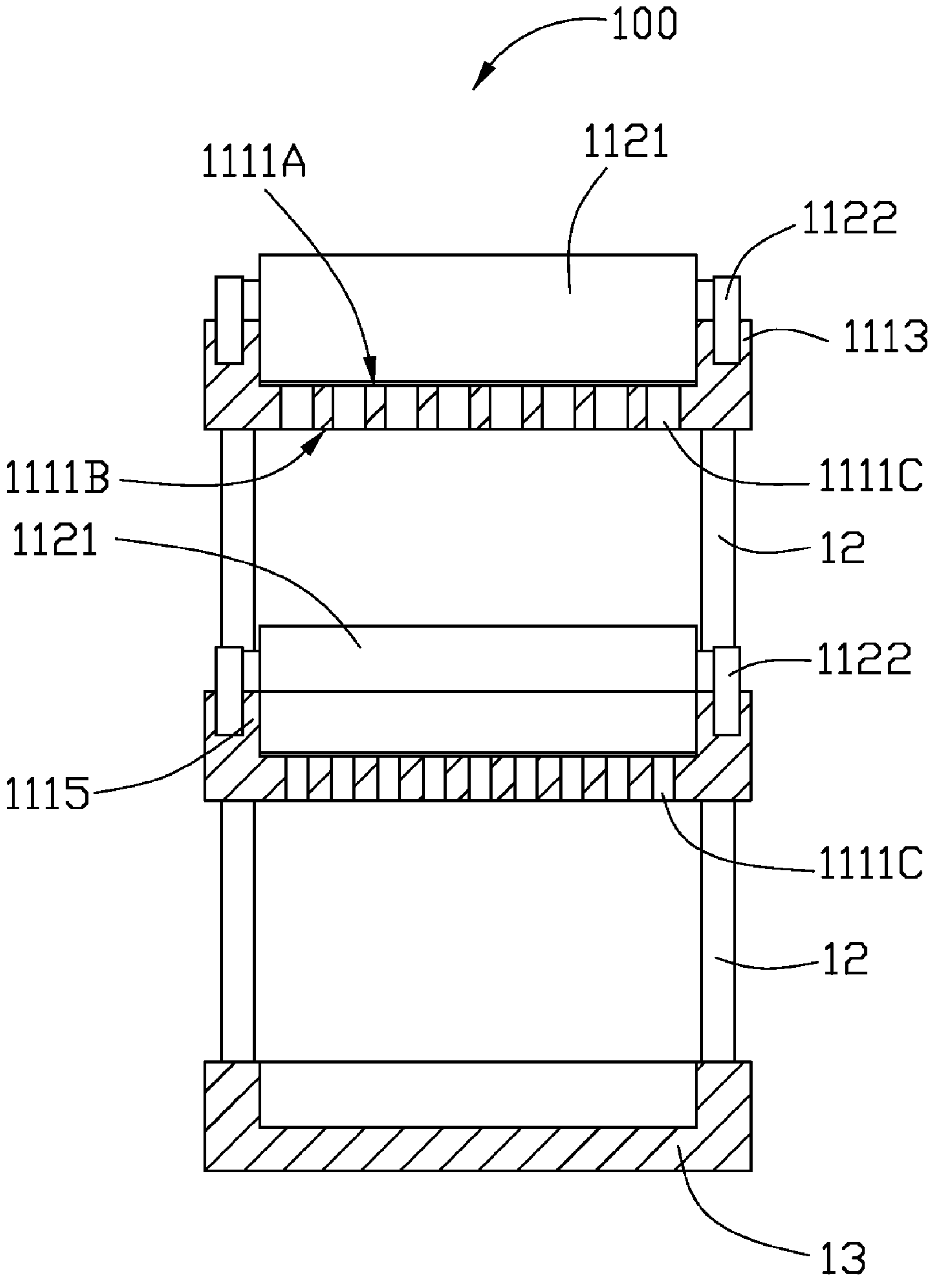
FIG. 2 is a sectional view taken along a line II-II of FIG. 1.

Referring to FIGS. 1-2, a lens screening device 100, according to an exemplary embodiment, is shown. The lens screening device 100 includes two screening plates 11 and four supporting poles 12.

Each of the screening plates 11 includes a tray 111 and a scraper 112. The tray 111 includes a rectangular bottom plate 1111 and four sidewalls 1112, 1113, 1114, 1115. The four sidewalls 1112, 1113, 1114, 1115 extend upward from four edges of the rectangular bottom plate 1111.

The rectangular bottom plate 1111 includes a top surface 1111A and a bottom surface 1111B opposite to the top surface 1111A. The bottom plate 1111 defines a number through holes 1111C extending through the top surface 1111A and the bottom surface 1111B. The through holes 1111C are circular holes corresponding to shapes of lenses. The through holes 111C in the same screening plate 11 have a same diameter.

Each of the sidewalls 1113, 1115 defines a sliding slot 1116 in the top surface thereof. Alternatively, the sliding slots 1116 can be defined in the top of the sidewalls 1112, 1114, instead of the sidewalls 1113, 1115, in other embodiments.

The scraper 112 includes a scraping plate 1121 and two wheels 1122. The scraping plate 1121 includes a rectangular plate 1121A and two shafts 1121B extending outwards from opposite short edges of the rectangular plate 1121A. The length of the scraping plate 1121A is a little shorter than the distance between the sidewalls 1113, 1115. The distance between the shaft 1121B and the lower long edge of the scraping plate 1121A is a little shorter than the height of the sidewalls 1113, 1115. The two wheels 1122 are rotatably coupled to the two shafts 1121B.

In assembly, four corners of each tray 111 are fixed to the poles correspondingly. The wheels 1122 are received in the sliding slots 1116. The wheels 1122 are movable in and along the sliding slots 1116 for driving the scraping plate 1121 to scrap the top surface 1111A.

The diameter of the through holes 1111C in the upper screening plates 11 is larger that of the through holes 1111C in the lower screening plate 11. Therefore, the lens screening device 100 can sort lenses by size in a desired range (from the diameter of the through holes in the bottom filter plate to the diameter of the through holes of the upper plate).

In practice, the lens screening device 100 further includes a collecting tray 13. The collecting tray 13 is disposed beneath the lower screening plate 11.

In operation, lenses are firstly placed in the upper screening plate 11. Then the upper scraping plate 1121A is pressed to slide along the sliding slots 1116. As a result, lenses of a qualified small diameter are filtered into the lower filter plate 11 via the through holes 1111C. Lenses of a disqualified large diameter are left in the upper screening plate 11. Similar to the upper screening plate 11, the lower scraping plate 1121A is pressed to slide along the sliding slots 1116. As a result, lenses of a qualified large diameter are left in the lower screening plate 11. Lenses of a disqualified small diameter are filtered into the lower collecting tray 13 via the through holes 1111C.

In practice, the scraper 112 can be driven by a driving motor (not shown).

The lens screening device 100 can control diameters of a great number of lenses at one time (of filtering process). Efficiency is increased. In addition, direct contact with the lenses by inspectors is avoided. Therefore, optical staining of the lenses is avoided too.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A lens screening device for screening lenses having a diameter within a range from a lower threshold to an upper threshold, the lens screening device comprising:

a plurality of supporting poles; and two screening plates, each of which comprises:

- a tray supported by the poles and defining a plurality of through holes of a same diameter; and
- a scraper slidably disposed on the tray and configured for scraping the tray;

wherein the diameter of the through holes in an upper screening plate is greater than that of the through holes in a lower screening plate.

2. The lens screening device as claimed in claim 1, wherein each tray of the screening plates comprises a rectangular bottom plate and four sidewalls extend upward from four edges of the rectangular bottom plate.

3. The lens screening device as claimed in claim 2, wherein the rectangular bottom plate comprises a top surface and a bottom surface opposite to the top surface, the through holes being defined in the bottom plate and extending through the top surface and the bottom surface.

4. The lens screening device as claimed in claim 3, wherein the through holes are circular holes.

5. The lens screening device as claimed in claim 2, wherein two parallel sliding slots are respectively defined in opposite side walls of each tray.

6. The lens screening device as claimed in claim 5, wherein the scraper comprising a scraping plate and two wheels rotatably connected to two ends of the scraping plate, the wheels being received in the sliding slots and movable in and along the sliding.

7. The lens screening device as claimed in claim 6, wherein the scraping plate comprises a rectangular plate and two shafts extending outwards from opposite short edges of the rectangular plate, the two wheels being rotatably coupled to the two shafts.

* * * * *